April 28, 1959     D. TANN     2,883,870
VARIABLE PITCH PULLEY
Filed June 10, 1957
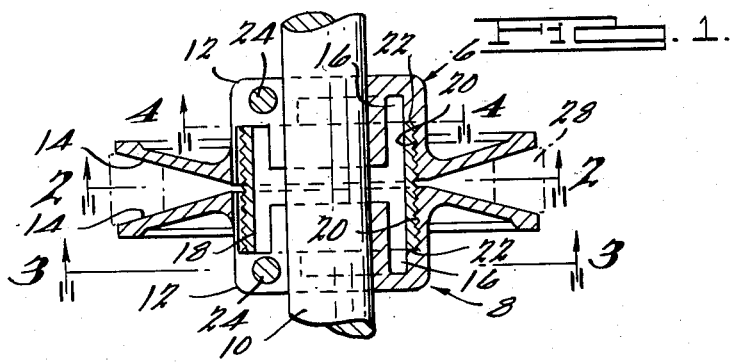
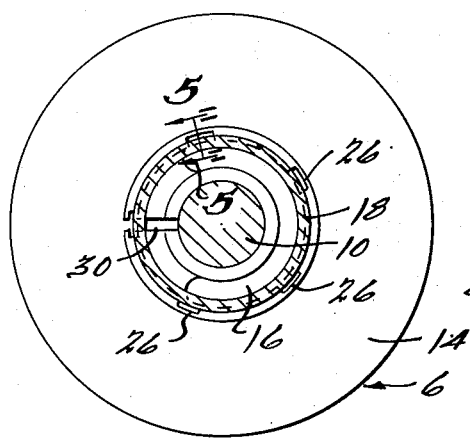
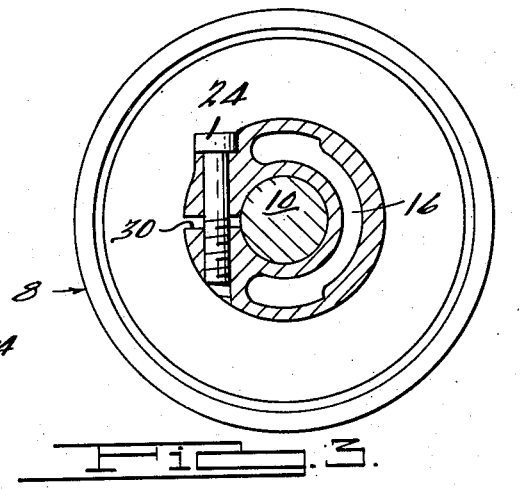
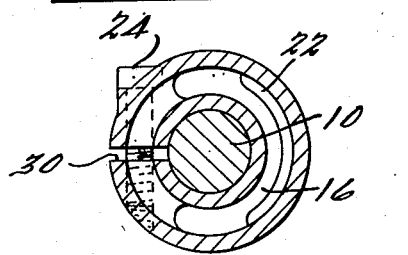
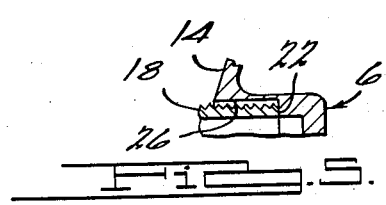
INVENTOR.
David Tann.
BY
ATTORNEYS United States Patent Office 2,883,870
Patented Apr. 28, 1959

2,883,870
VARIABLE PITCH PULLEY
David Tann, Detroit, Mich.
Application June 10, 1957, Serial No. 664,638
5 Claims. (Cl. 74—230.17)

This invention relates to variable pitch pulleys and particularly to a pulley having two identical halves which are axially positioned relative to one another by a threaded sleeve.

The main objects of the invention are to provide a variable pitch pulley; to provide a variable pitch pulley having two identical pulley halves axially adjustable relative to one another by a threaded sleeve to vary the pitch thereof; to provide a variable pitch pulley having two identical pulley halves adapted to be clamped to a shaft after they have been axially positioned relative to one another by a threaded sleeve; and to provide a variable pitch pulley that is relatively inexpensive to manufacture, light in weight, and rugged in construction.

Other objects and features of novelty of the invention will be specifically pointed out or will become apparent when referring, for a better understanding of the invention, to the following description taken in conjunction with the accompanying drawing, wherein:

Figure 1 is a sectional view of a variable pitch pulley embodying features of the invention;

Fig. 2 is a sectional view of the structure illustrated in Fig. 1, taken along the line 2—2 thereof;

Fig. 3 is a sectional view of the structure illustrated in Fig. 1, taken along the line 3—3 thereof;

Fig. 4 is a sectional view of the structure illustrated in Fig. 1, taken along the line 4—4 thereof; and Fig. 5 is a sectional view of the structure illustrated in Fig. 2, taken along the line 5—5 thereof.

Referring to the drawing, a variable pitch pulley embodying features of the invention is comprised of two identical pulley halves 6 and 8 slidably disposed on a shaft 10. Each of the pulley halves has a truncated conical portion 14, and a hub portion 12 with an annular cavity 16 therein which reduce the weight of the pulley halves and enable an externally threaded sleeve 18 to be inserted therein. The threaded sleeve 18 threadably engages internal threads 20 on the wall of each of the annular cavities 16 to provide an axial adjustment for the pulley halves.

It will be observed in Fig. 1 that the ends of the sleeve 18 are adapted to abut against internal shoulders 22 to limit the axial movement of the pulley halves 6 and 8 toward each other, and that each of the hub portions 12 are split as at 30 to enable the pulley halves to be contracted so that they may be rigidly clamped to the shaft 10 by a bolt 24. It will also be observed in Figs. 2 and 3 that a plurality of equally spaced grooves 26 are provided in the internally threaded surface of the annular cavities 16 to facilitate the machining of the threads 20 by breaking up the cutting formed to prevent galling when cutting an internal thread on a large diameter.

To vary the pitch of the pulley halves the bolts 24 are turned to release the clamping action on the shaft 10, and the pulley halves are rotated on the threaded sleeve 18 until they are axially positioned relative to one another as desired. The bolts 24 are then tightened to clamp the hub portions 12 on the shaft 10 and to fix the pulley halves relative to one another.

When the pulley halves are moved in an axial direction away from one another, a V-belt 28 shown in dotted lines in Figure 1 must move radially inwardly to contact the truncated conical portions 14 of the pulley halves. By enabling the V-belt to position itself at a radially inward point, it is apparent that the pitch thereof is reduced. Conversely, if it is desired to increase the pitch, the pulley halves may simply be moved in an axial direction toward each other which, of course, means that the V-belt will have to ride in a radially outward position.

By making the two pulley halves 6 and 8 identical to each other, the number of parts required to be kept in stock are, of course, reduced and by providing the threaded sleeve 18 for axially adjusting the pulley halves 6 and 8 relative to one another, a more positive adjustment is obtained. In addition, the truncated conical portions are restrained from being forced apart since the threaded sleeve 18 provides a means for holding them together at their inner periphery. By this construction, complete reliance is not placed upon the clamping bolts 24 for preventing the pulley halves from being forced apart by the wedging action of the V-belt 28.

What is claimed is:

1. A variable pitch pulley comprising two pulley halves adapted to be slidably disposed directly on a shaft, each of said pulley halves having a split hub portion and a truncated conical portion, a threaded sleeve disposed between and threadably engaging said hub portions adjacent the radially outer periphery thereof, and means for clamping the split hub portions directly to the shaft.

2. A variable pitch pulley comprising two pulley halves adapted to be slidably disposed on a shaft, each of said pulley halves having a split hub portion with an annular recess therein and a truncated conical portion, a threaded sleeve disposed between the pulley halves and within said recesses in threaded engagement with each of the hub portions, and means for clamping the hub portions to the shaft.

3. A variable pitch pulley comprising two identical pulley halves adapted to be slidably disposed on a shaft, each of said pulley halves having a split portion with an annular recess therein and a truncated conical portion, a threaded sleeve disposed between the pulley halves and within said recesses in threaded engagement with each of the hub portions, and a bolt disposed in each of the hub portions transversely of the split therein for clamping the hub portions to the shaft.

4. A variable pitch pulley comprising two identical pulley halves adapted to be slidably disposed on a shaft, each of said pulley halves having a hub portion and a truncated conical portion, each of said hub portions having an annular recess therein extending inwardly from the adjacent faces thereof, a threaded sleeve disposed between said hub portions and within said recesses adapted to threadably engage said hub portions for axially adjusting one relative to the other, and a bolt disposed in each of the hub portions transversely of the split therein for clamping the hub portions to the shaft.

5. A variable pitch pulley comprising two identical pulley halves adapted to be slidably disposed on a shaft, each of said pulley halves having a split hub portion and a truncated conical portion, each of said hub portions having an annular recess therein extending inwardly from the adjacent faces thereof, the radially outward wall of each of said recesses having an internal thread therein, each of said truncated conical portions commencing at the periphery of said adjacent faces and tapering away from one another, an externally threaded sleeve threadably engaging said internal threads, and a bolt disposed in each of the hub portions transversely of the splits therein for clamping the hub portions to the shaft.

References Cited in the file of this patent
UNITED STATES PATENTS

| | | |
|---|---|---|
| 2,062,629 | Zimic | Dec. 1, 1936 |
| 2,187,188 | Whitcomb | Jan. 16, 1940 |
| 2,447,958 | Mueller et al. | Aug. 24, 1948 |
| 2,555,189 | Fuchslocher | May 29, 1951 |
| 2,577,516 | Firth | Dec. 4, 1951 |

UNITED STATES PATENT OFFICE
CERTIFICATE OF CORRECTION

Patent No. 2,883,870                                                    April 28, 1959

David Tann

It is hereby certified that error appears in the printed specification of the above numbered patent requiring correction and that the said Letters Patent should read as corrected below.

Column 2, line 34, before "portion" insert -- hub --.

Signed and sealed this 9th day of February 1960.

(SEAL)
Attest:

KARL H. AXLINE                                         ROBERT C. WATSON
Attesting Officer                                    Commissioner of Patents